March 16, 1971      D. A. SMITH      3,570,167
SUBMERGIBLE HYDROPLANER
Filed Nov. 25, 1968
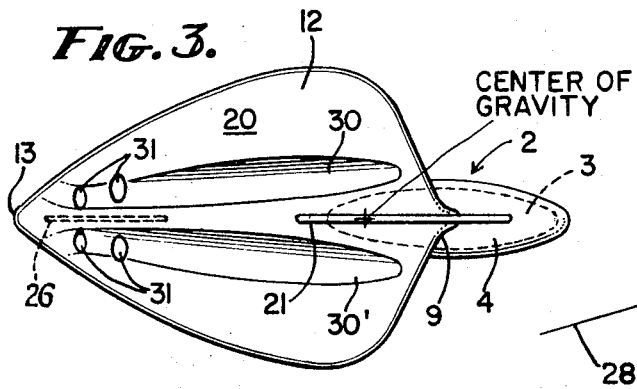
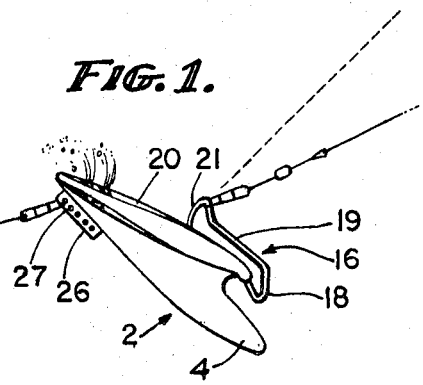
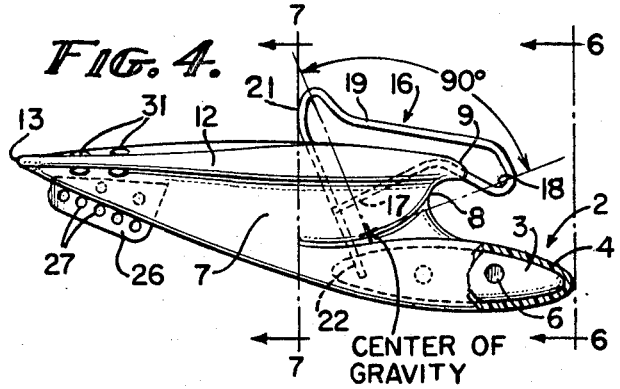
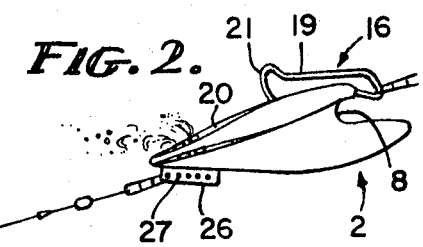
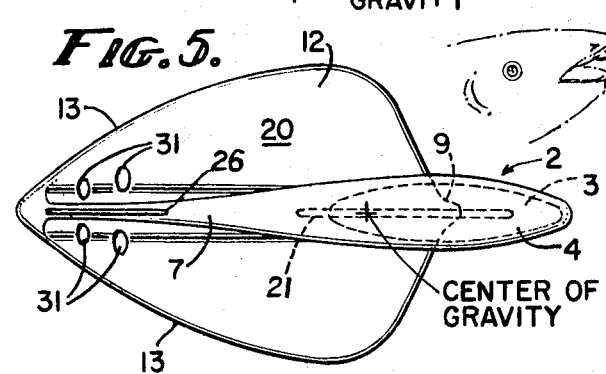
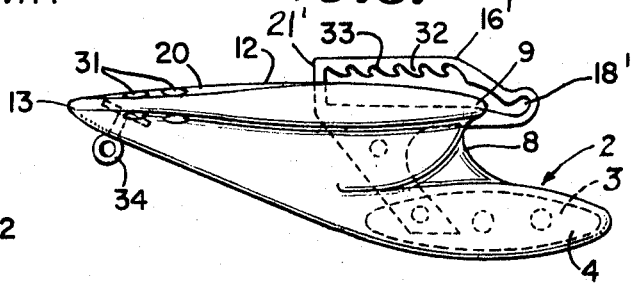
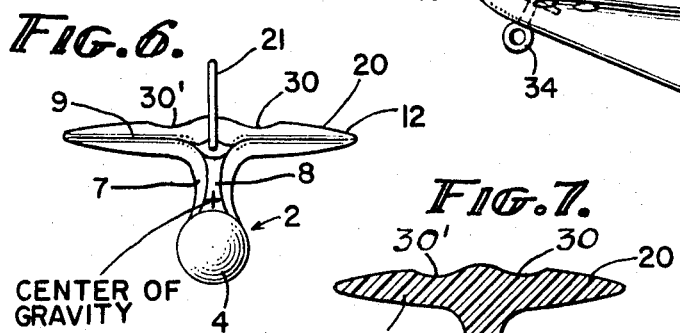
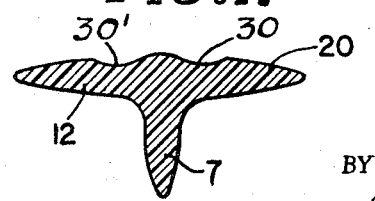
INVENTOR.
DANIEL A. SMITH
BY
John J. Hewitt ન
United States Patent Office 3,570,167
Patented Mar. 16, 1971

3,570,167
SUBMERGIBLE HYDROPLANER
Daniel A. Smith, 291 Madrone Ave.,
Santa Clara, Calif. 95051
Filed Nov. 25, 1968, Ser. No. 778,408
Int. Cl. A01k 85/00
U.S. Cl. 43—42.06                                                    20 Claims

ABSTRACT OF THE DISCLOSURE

A submergible hydroplaner for attachment to a fishing line in front of the baited hook. A wing on the hydroplaner may be shifted between positive and negative angles of attack to tow the bait to the desired depth while trolling, and bring the hydroplaner and attached fish to the surface after a fish has taken the bait. If the fish is lost while being brought to the surface, the hydroplaner will readjust to once again dive to the proper depth.

BACKGROUND OF INVENTION

Various types of hydroplaners may be found in the prior art relating to fishing. To my knowledge none of the prior art hydroplaners possess the facility of automatic adjustment for depth depending upon whether or not a fish is hooked. The conventional way to place a baited hook at a desired fishing depth is to utilize detachable weights which are usually lost when a fish strikes the bait and is caught by the hook. The weights are frequently lost whether the fish is hooked or not. Or, if the fish is hooked but is lost during the time that he is being reeled in, both fish and weights are lost. Such loss of weights is expensive and time-consuming. Accordingly, it is one of the objects of the invention to provide a hydroplaner that may be permanently attached to a fishing line, and which is adjustable to carry the baited hook to the desired depth and bring a hooked fish to the surface without danger of losing the hydroplaner or fish.

Even the best fishermen occasionally lose fish during the reeling-in process. Accordingly, it is another object of the invention to provide a hydroplaner that will readjust its angle of attack upon loss of a fish so as to return the baited hook to fishing depth if a fish is inadvertently lost when it is being reeled in.

Depending on what type of fish the fisherman seeks, trolling speeds vary from about 2 to 15 knots. It is one of the objects of the present invention to provide a hydroplaner that may be adjusted in correlation to the trolling speed of the boat to carry the hydroplaner to the desired depth.

Conventional hydroplaners do not normally function as lures to attract fish to the bait. It is a still further object of the invention to provide an adjustable hydroplaner which also functions as a lure.

Hydroplaners and other fishing devices that are towed along the bottom of a stream or other body of water frequently encounter obstructions on the bottom that tend to snag them. It is accordingly another one of the objects of the invention to provide a hydroplaner which will free itself from such an obstruction by turning end-for-end without disturbing the predetermined and pre-set depth adjustment of the hydroplaner.

The invention possesses other objects and features of advantage, some of which, with the foregoing will be apparent from the following description and the drawings. It is to be understood however that the invention is not limited to the embodiment illustrated and described, as it may be embodied in various forms within the scope of the appended claims.

BRIEF SUMMARY OF DISCLOSURE

In terms of broad inclusion, the hydroplaner of the invention comprises a hydrodynamically-configured substantially-elongated oval-shaped keel, the top surface of which merges into a dorsal-type support pylon. The upper extremity of the pylon merges smoothly with a longitudinally-extending generally-flat wing longer in a fore-aft direction than in a transverse direction, the plane of which lies spaced above but substantially parallel to a plane containing the long axis of the keel. In relation to the center of gravity of the hydroplaner, the wing is above the center of gravity and the keel is below the center of gravity. Suspension means are provided adjacent the forward and top surface of the wing for slidable attachment of a suspension line thereto. The suspension means is elongated and extends fore and aft of the center of gravity to provide suspension loops fore and aft of the center of gravity so that suspension aft of the center of gravity will result in a negative angle of attack of the wing, while suspension forward of the center of gravity will result in a positive angle of attack of the wing. Means are provided at the aft end of the hydroplaner for attachment of a leader, and means are also provided in the wing to create a turbulent wake of air bubbles which burst and emit an audible sound attractive to fish.

DESCRIPTION OF DRAWINGS

FIG. 1 is a side elevation illustrating the hydroplaner attached to a fishing line and in a diving attitude, caused by attachment of the suspension line aft of the center of gravity.

FIG. 2 is a side elevational view similar to FIG. 1 but showing the hdroplaner in a surfacing attitude resulting from automatic shifting of the point of suspension from aft of the center of gravity to forward of the center of gravity when a fish is hooked.

FIG. 3 is a plan view of the hydroplaner.

FIG. 4 is a side elevational view in enlarged scale showing details of constructoin in dash lines, and also showing the location of the center of gravity and the positions of the various parts of the hydroplaner in relation to the center of gravity.

FIG. 5 is a bottom plan view of the hydroplaner.

FIG. 6 is a front elevational view taken in the direction indicated by the arrows 6—6 in FIG. 4.

FIG. 7 is a vertical cross-sectional view taken in the plane indicated by the line 7—7 in FIG. 4.

FIG. 8 is a side elevational view illustrating a different embodiment of the hydroplaner.

DESCRIPTION OF PREFERRED EMBODIMENT

In terms of greater detail, the submergible hydroplaner of the invention comprises an elongated hydrodynamically-configured and generally oval-shaped keel position designated generally by the numeral 2, and formed from a relatively heavy elongated oval-shaped body 3, preferably of lead, embedded within a body 4, conveniently of a synthetic resinous material capable of being molded. Recesses 6 are formed in the body 3 to form a lock with the enveloping plastic.

The plastic body that envelops the heavy body 3, extends upwardly in a dorsal-type pylon 7, the forward edge 8 of which is hydrodynamically curved as shown to terminate in a leading edge 9 of a longitudinally extending ray or wing 12. The wing is integrally joined along its entire length to the upper edge portion of the dorsal pylon, the latter tapering toward the aft end of the hydroplaner to merge smoothly with the trailing edges 13 of the wing.

As shown in FIGS. 4, 5 and 6, the configurations of the keel portion, the dorsal pylon, and the wing are such as to produce a hydrodynamic configuration which facilitates drawing the hydroplaner through the water. Additionally, the leading edge of the wing is positioned somewhat to the rear of the nose portion of the keel portion 2, and forward of the center of gravity of the hydroplaner. As shown best in FIGS. 3, 4 and 5, the leading edge of the wing lies approximately midway between the center of gravity and the extreme forward end of the nose of the keel portion. Also, a chord joining the leading edge of the wing with the intersection of the trailing edges lies above the center of gravity as shown. In relation to a longitudinal axis through the keel, such axis is below the center of gravity and substantially parallel to a chord through the wing.

To suspend the hydroplaner from a fishing or other suspension line, a suspension assembly designated generally by the numeral 16 is provided. In the embodiment of the invention illustrated in FIGS. 1 through 7, the suspension assembly comprises a length of heavy-gauge wire having one end 17 embedded in the body of plastic forming the union between the dorsal pylon and the wing, and emerging at the leading edge of the wing to form a forward suspension loop 18 lying forward of the center of gravity and in a plane between the center of gravity and the wing. From the forward suspension loop the wire extends backwardly in a slide bearing section 19 toward the trailing edges of the wing, and disposed above the top surface 20 of the wing a small amount as shown.

The wire extends backwardly beyond the center of gravity, and its rear end is inclined sharply upwardly to form an aft suspension loop 21 which lies aft of the center of gravity. From the aft suspension loop the wire is then carried around and downwardly in an end portion 22 embedded in the central body portion of the pylon. The wire passes downwardly through the dorsal pylon and is embedded or otherwise securely attached to the keel body 3 adjacent its trailing end. Referring to FIG. 4, it will be seen that the aft suspension loop 21 lies above the wing and aft of the center of gravity. It also lies above the forward suspension loop. Preferably, the fore and aft suspension loops are related to the center of gravity in such a way that planes passing through the suspension loops and intercepting each other at the center of gravity would lie approximately perpendicular to each other as shown in FIG. 4. In use, the fishing or other suspension line is slidably attached to the suspension assembly in the manner indicated in FIGS. 1 and 2, and operates by a mode which will hereinafter be explained in greater detail.

Tow means for a leader and hook assembly is provided adjacent the trailing edge of the hydroplaner. As indicated in FIGS. 1, 2 and 4, embedded in the trailing edge of the dorsal pylon along a median line is a downwardly-extending tow plate 26 having apertures 27 therein for attachment of a leader 28. The plate is preferably provided with five apertures so that a choice may be made for connection of a line, depending upon the depth at which it is desired to troll. For deeper diving, the leader is moved forwardly on the plate.

It has been found that the hydroplaner of the invention also functions as a lure, in addition to its function to tow the baited hook to the desired depth. To accomplish this result, the upper surface of the wing, on opposite sides of a median plane through the central body section, is provided with a pair of longitudinally-extending channels 30 and 30', each extending rearwardly from the leading edge toward the trailing edge of the wing as shown in FIGS. 3, 6 and 7. When the hydroplaner is drawn through the water, the channels 30 and 30' channel separate streams of water rearwardly over the surface of the wing.

Adjacent the trailing edges of the wing, and intersecting each of the channels, are a plurality of apertures 31 as shown best in FIGS. 3 and 5. Water channeled rearwardly along the channels is intercepted by the apertures, with a portion of the water being diverted through the apertures to create a wake formed of a multiplicity of bubbles. It has been found that shortly after such bubbly wake is formed, the bubbles burst and in so doing create a noise that is effective to attract fish.

In the embodiment of the hydroplaner illustrated in FIG. 8, like numerals have been applied to like structure. Corresponding structure similar in function but different in design has been identified by primed numbers. One difference in the embodiment illustrated in FIG. 8 is that the suspension assembly 16' in FIG. 8 has been modified to provide a series of tooth-like members 32 separated by notches 33. The tooth-like members 32 project downwardly toward the upper surface of the wing but are spaced therefrom an amount sufficient to permit a snap-and-swivel assembly, or other slidable suspension means, to pass freely between the free ends of the tooth-like members and the top surface of the wing. Each tooth-like member is inclined forwardly toward the leading edge of the wing. As with the suspension assembly 16 of FIGS. 1–7, the suspension assembly 16' of FIG. 8 is provided with a forwardly-projecting suspension loop 18' and an aft suspension loop 21' which bear the same relationship to the center of gravity of the hydroplaner as the suspension assembly previously discussed in connection with FIGS. 1–7.

Another difference in the embodiment illustrated in FIG. 8 is that the leader tow plate 26 has been eliminated and a single eyelet 34 has been provided for attachment of the leader. In other respects, the structures are essentially the same.

Referring to FIGS. 1 and 2, in use, a snap-and-swivel assembly attached to an appropriate fishing or other suspension line is slidably engaged with the suspension assembly in the aft suspension loop. When suspended from the aft suspension loop, the center of gravity of the hydroplaner is situated so that the hydroplaner will be inclined downwardly in a negative angle of attack as illustrated. The same attitude will be assumed by the hydroplaner of FIG. 8 when the snap-and-swivel assembly is attached behind the rearmost tooth member, which, as shown, also lies aft of the center of gravity.

The leader assembly with hook and bait is then attached by means of a snap-and-swivel assembly to the plate 26 or eyelet 34, as the case may be. Thus assembled, the entire hydroplaner with hook and bait is lowered into the water. The hydroplaner will dive as soon as it enters the water and the depth to which it will descend is dependent upon the aperture 27 to which the leader is attached, the position along the suspension assembly of the embodiment of FIG. 8 to which the snap-and-swivel assembly is attached, the length of line that has been payed out and the speed of the boat.

To secure greater depth, the leader is attached forwardly on the plate 26 and the line is attached, as illustrated in FIG. 1, to the aft suspension loop. In the embodiment illustrated in FIG. 8, the notches 33 between the downwardly-projecting tooth-like members 32 serve to anchor the snap-and-swivel assembly attached to the end of the fishing line, and serve to gauge the depth to which the hydroplaner will dive. Thus, if the snap-and-swivel assembly is attached midway between the ends of the suspension assembly, the center of gravity of the hydroplaner will be located substantially directly below such point of suspension and the wing will lie substantially horizontal. Readjustment forward of this mid-position will cause the hydroplaner to be inclined upwardly in a positive angle of attack of the wing, and suspension from a point aft of this mid-position will cause the hydroplaner to be inclined downwardly in a negative angle of attack, thus causing the hydroplaner to dive when drawn through the water.

With the hydroplaner being towed in the position of use illustrated in FIG. 1, a fish striking the bait and being caught by the hook will impose a sudden drag on the trailing edge of the hydroplaner of such a magnitude that the hydroplaner will pivot about the aft suspension loop as a fulcrum and cause the attitude of the hydroplaner to shift suddenly to an upwardly-inclined positive angle of attack. When this occurs, the snap-and-swivel assembly attached to the suspension assembly will slide forwardly along the slide bearing portion of the suspension assembly until it is caught in the suspension loop 18. In this position, as illustrated in FIG. 2, the center of gravity is aft of the point of suspension and the hydroplaner will maintain its positive angle of attack until it is overbalanced. Additionally, when the hydroplaner is in this attitude, the tension of the fishing line attached to the forward end of the suspension assembly will be applied in essentially a straight line through the hydroplaner and leader assembly to the hooked fish.

Another effect is that the upwardly-inclined attitude of the hydroplaner tends to be maintained, so that continued forward movement of the hydroplaner through the water will cause an upward planing action which reduces the ability of the fish to deviate from the course in which he is being pulled by the hydroplaner, thus facilitating bringing the fish to the surface.

If it happens that the fish is lost during the time that it is being landed, the drag on the hydroplaner created by the fish will suddenly cease. Tension on the fishing line will also be diminished. As soon as a small amount of slack exists in the line, the weight of the keel 2 being concentrated at the center of gravity of the hydroplaner will cause the hydroplaner to tilt downwardly so that the snap-and-swivel assembly will slide backwardly along the suspension assembly 16 in the embodiment illustrated in FIGS. 1 through 7. The hydroplaner will reassume the negative angle of attack position illustrated in FIG. 1.

With the embodiment illustrated in FIG. 8, when the fish is lost, the concentration of weight at the center of gravity of the hydroplaner will again cause the hydroplaner to tilt downwardly somewhat from a positive angle of attack. However, because of the interposition of the tooth-like members 32, the snap-and-swivel assembly cannot slip back beyond the first notch in the suspension assembly. Suspended from this position, the hydroplaner will maintain a reduced positive angle of attack which will bring it to the surface. The snap-and-swivel assembly may then be manually re-set in whatever notch is required to cause the hydroplaner to dive to the desired depth.

Having this described my invention, what is claimed to be novel and sought to be protected by Letters Patent is as follows:

1. A submergible hydroplaner transversely symmetrical with respect to a vertical plane including the center of gravity of the hydroplanar and comprising:
   (a) an elongated hydrodynamically configured keel portion situated below the center of gravity;
   (b) a substantially flat hydrodynamically configured wing having a leading and a trailing edge and fixedly superposed over said keel above the center of gravity;
   (c) elongated suspension means fixed on the hydroplanar extending fore and aft of the center of gravity for slidable attachment of a suspension line thereto; and
   (d) tow means on the hydroplanar adjacent the trailing edge of the wing for attachment of an item to be towed.

2. The combination according to claim 1, in which a dorsal pylon is interposed between the keel portion and the wing.

3. The combination according to claim 1, in which the wing is elongated in the same direction as the keel, the leading edge thereof being ovate and merging smoothly from the ends of the major axis into converging trailing edges.

4. The combination according to claim 1, in which said elongated keel portion is generally symmetrical about a longitudinal axis, and a chord between the leading and trailing edges is generally parallel to said longitudinal axis of the keel portion.

5. The combination according to claim 1, in which said wing is elongated in the direction of the long dimension of the keel, the leading edge of the wing being disposed forwardly of the center of gravity, and the trailing edges converging rearwardly and intercepting each other at a point included in a vertical plane which also includes the center of gravity.

6. The combination according to claim 1, in which said wing is provided with a pair of channels extending substantially the full length of the wing in a fore-aft direction.

7. The combination according to claim 1, in which said wing possesses upper and lower surfaces, and a plurality of apertures are formed in said wing between said upper and lower surfaces and adjacent the trailing edges thereof.

8. The combination according to claim 1, in which the elongated suspension means is provided with a suspension loop forward of the center of gravity and a suspension loop aft of the center of gravity, said fore and aft suspension loops being rigidly interconnected by a slide bearing along which said suspension line may slide between said suspension loops.

9. The combination according to claim 1, in which suspension of the hydroplaner from said suspension means aft of the center of gravity results in said wing assuming a negative angle of attack so as to impose a vertically downwardly directed component of force on the wing when the hydroplanar is drawn through the water.

10. The combination according to claim 1, in which suspension of the hydroplaner from said suspension means forward of the center of gravity results in said wing assuming a positive angle of attack so as to impose a vertically upwardly directed force on the wing when the hydroplaner is drawn through the water.

11. The combination according to claim 1, in which said keel portion includes a heavy body encapsulated in moldable material, and said wing is molded from the same material and integral with the material encapsulating the heavy body.

12. The combination according to claim 2, in which said dorsal pylon is integrally united to the wing over its entire length from leading to trailing edges.

13. The combination according to claim 6, in which said channels are disposed on the wing on opposite sides of the center of gravity, and a plurality of apertures are formed in the wing within each channel adjacent the trailing edges of the wing.

14. The combination according to claim 8, in which said suspension loop aft of the center of gravity lies above said wing, and said forward suspension loop lies below said wing.

15. The combination according to claim 8, in which said wing is interposed between said aft suspension loop and the center of gravity, and said forward suspension loop lies between the wing and the center of gravity.

16. The combination according to claim 8, in which said forward suspension loop lies above the center of gravity and below and forward of the leading edge of the wing.

17. The combination according to claim 8, in which said fore and aft suspension loops are positioned so that a plane including said aft suspension loop and the center of gravity is substantially perpendicular to a plane including said forward suspension loop and the center of gravity.

18. The combination according to claim 8, in which said slide bearing connects said fore and aft suspension loops in a manner whereby a drag imposed on said tow means of sufficient magnitude to pivot the hydroplaner about said aft suspension loop and the end of the line attached thereto through an arc sufficient to change the angle of attack from a negative angle to a positive angle will effect anutomatic transfer of the point of suspension from said aft suspension loop to said forward suspension loop so as to thereafter impose a vertically upwardly directed force on said wing when it is drawn through the water.

19. The combination according to claim 8, in which said slide bearing connects said fore and aft suspension loops in a manner whereby release of a drag imposed on said tow means of sufficient magnitude to retain the hydroplaner in a positive angle of attack when drawn through the water by connection of said line to said forward suspension loop will automatically effect pivoting of the wing to a negative angle of attack and shift the point of suspension from said forward suspension loop to said aft suspension loop so as to change the force relationship between the water and the hydroplaner from a vertically upwardly directed force to a vertically downwardly directed force.

20. The combination according to claim 8, in which said slide bearing includes a bar having a plurality of notches therealong defining lugs precluding shifting movement of said suspension line from the forward suspension loop to the aft suspension loop.

References Cited

UNITED STATES PATENTS

| | | | |
|---|---|---|---|
| 2,065,246 | 12/1936 | Saarinen | 43—42.5X |
| 2,566,029 | 8/1951 | Louthan | 43—43.13 |
| 2,726,475 | 12/1955 | Wiselka | 43—43.13 |
| 3,221,435 | 12/1965 | St. Amant | 43—42.06 |
| 3,466,787 | 9/1969 | Collins | 43—43.13 |

FOREIGN PATENTS

| | | | |
|---|---|---|---|
| 1,344,477 | 10/1963 | France | 43—43.13 |

ALDRICH F. MEDBERY, Primary Examiner

D. J. LEACH, Assistant Examiner

U.S. Cl. X.R.

43—43.13